(No Model.)

S. STEPHENS.
PULLEY.

No. 302,954.                              Patented Aug. 5, 1884.

WITNESSES:
M. Carsten
E. O. Abbott

INVENTOR:
Samuel Stephens
By H. P. Hood
Atty.

UNITED STATES PATENT OFFICE.

SAMUEL STEPHENS, OF INDIANAPOLIS, INDIANA.

PULLEY.

SPECIFICATION forming part of Letters Patent No. 302,954, dated August 5, 1884.

Application filed January 4, 1884. (No model.)

*To all whom it may concern:*

Be it known that I, SAMUEL STEPHENS, a citizen of the United States, residing at Indianapolis, in the county of Marion and State of Indiana, have invented a new and useful Improved Pulley, of which the following is a specification.

My invention relates to an improved construction for the arms of band-pulleys for driving machinery.

The object of my improvement is to form a pulley which will combine great strength with light weight.

The accompanying drawings illustrate my invention.

Figure 1:
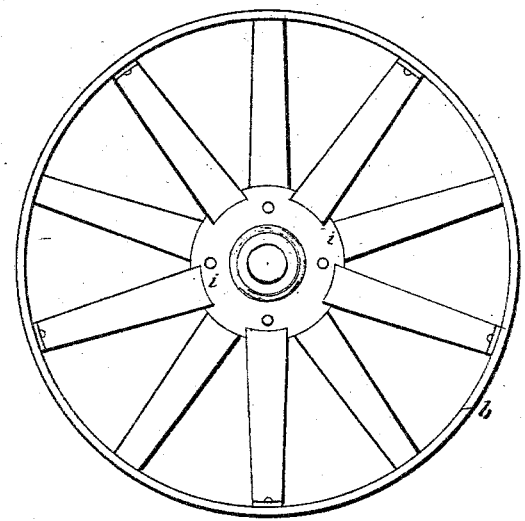
Figure 2:
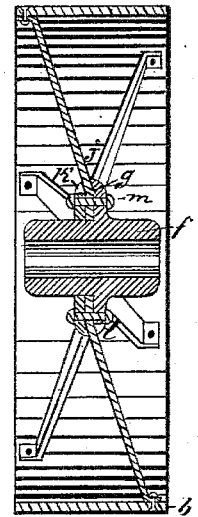
Figure 3:
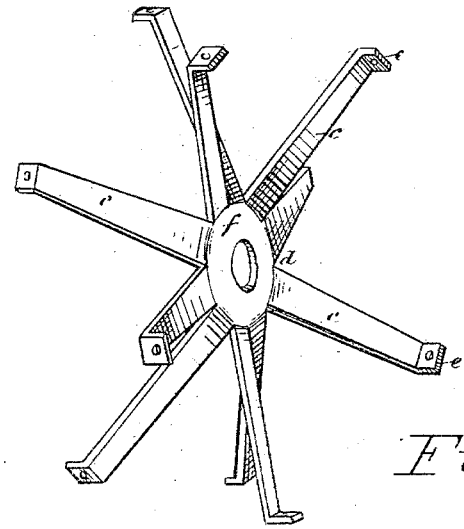

Figure 1 is a side elevation. Fig. 2 is a section on the line $a\ a$. Fig. 3 is a perspective view of the arms with the rim removed.

I construct my improved pulley as follows: The rim $b$ may be a light cylinder of iron, as shown, or it may be formed of wood or any other suitable material. Said rim is formed separately from the arms and hub.

To form the arms for my pulley, I cut out a circular disk of sheet metal, somewhat larger in diameter than the interior diameter of the rim. I then cut out triangular portions from said disk, leaving a series of equidistant arms, $c\ c$, joined together by a central portion, $d$. I now bend the arms $c\ c$ in opposite directions at the point where they join the central portion, $d$, each alternate arm being bent to one side of the plane of said central portion, and the remaining arms bent to the other side, thus forming two series of arms inclined outward in opposite directions from a common center. The ends of all the arms are now bent outward again at points equidistant from the center of the disk and corresponding to the radius of the interior of rim $b$, thus forming lugs $e$, which are secured to the interior of the rim by rivets or screws. A hub, $f$, having a collar, $g$, formed integral therewith, on which are projections $i$, which fit between alternate spokes, is now passed through a central hole, $j$, in the disk $d$, and a loose collar, $k$, having projections $l$ thereon, like projections $i$, is slipped over said hub, as shown, and the disk is secured between the collars $g$ and $k$ by bolts or rivets $m$, passed through said collars and through the disk. A pulley is thus formed in which the arms are very light, and at the same time, on account of their arrangement, are very strong.

I claim as my invention—

1. In a pulley having its rim and its arms formed separately, a series of arms united to a common center and diverging radially and laterally therefrom, said arms secured to said rim alternately on opposite sides thereof, and a hub centrally secured to said arms, all substantially as specified.

2. A pulley having two series of opposed arms formed from a single disk cut and bent substantially as described.

3. In a pulley, rim $b$, arms $c\ c$, formed as described, secured to said rim and converging laterally and radially toward a central hub, hub $f$, having collar $g$ integral therewith, and loose collar $k$, all combined substantially as specified.

SAMUEL STEPHENS.

Witnesses:
H. P. HOOD,
E. O. ABBOTT.